United States Patent
Iwabuchi et al.

(10) Patent No.: US 12,375,132 B2
(45) Date of Patent: Jul. 29, 2025

(54) RELAY CONTROL SYSTEM, RELAY APPARATUS, AND RELAY CONTROL METHOD

(71) Applicant: NIPPON TELEGRAPH AND TELEPHONE CORPORATION, Tokyo (JP)

(72) Inventors: Masashi Iwabuchi, Musashino (JP); Yoghitha Ramamoorthi, Musashino (JP); Tomoaki Ogawa, Musashino (JP); Yasushi Takatori, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 43 days.

(21) Appl. No.: 18/291,245

(22) PCT Filed: Aug. 6, 2021

(86) PCT No.: PCT/JP2021/029435
§ 371 (c)(1),
(2) Date: Jan. 23, 2024

(87) PCT Pub. No.: WO2023/013073
PCT Pub. Date: Feb. 9, 2023

(65) Prior Publication Data
US 2024/0340042 A1    Oct. 10, 2024

(51) Int. Cl.
*H04B 7/04* (2017.01)
*H04B 7/0408* (2017.01)

(52) U.S. Cl.
CPC ....... *H04B 7/04013* (2023.05); *H04B 7/0408* (2013.01)

(58) Field of Classification Search
CPC ... H04B 7/04013; H04B 7/0408; H04B 7/145
See application file for complete search history.

(56) References Cited

U.S. PATENT DOCUMENTS

2022/0216908 A1* 7/2022 Choi ............... H04B 7/0617

OTHER PUBLICATIONS

Basar et al., "Wireless Communications Through Reconfigurable Intelligent Surfaces", IEEE Access, vol. 7, 2019, Aug. 13, 2019, pp. 116753-116773.

(Continued)

*Primary Examiner* — Sung S Ahn
(74) *Attorney, Agent, or Firm* — XSENSUS LLP (57) ABSTRACT

A relay apparatus includes a plurality of reflection elements that applies independent phase shifts to an incoming wave, a communication circuitry that receives transmission point information from one or more transmission points, an element allocation circuitry, and a phase control circuitry. The element allocation circuitry determines the number of communication links to be established via the relay apparatus based on the transmission point information, determines the number of reflection elements to be allocated to each of the communication links, and determines a reflection element to be allocated to each of the communication links according to the number of the reflection elements. The phase control circuitry determines the phase weights so that a beam directed to a reception point being a communication destination of each communication link is generated by a reflection wave generated by each reflection element allocated to each of the communication links.

18 Claims, 10 Drawing Sheets

(56) References Cited

OTHER PUBLICATIONS

Wu et al., "Intelligent Reflecting Surface Enhanced Wireless Network via Joint Active and Passive Beamforming", IEEE Transactions on Wireless Communications, vol. 18, No. 11, Nov. 2019, pp. 5394-5409.
Zheng et al., "Intelligent Reflecting Surface-Enhanced OFDM: Channel Estimation and Reflection Optimization" IEEE Wireless Communications Letters, vol. 9, No. 4, Apr. 2020, pp. 518-522.

* cited by examiner

RELAY CONTROL SYSTEM, RELAY APPARATUS, AND RELAY CONTROL METHOD

CROSS-REFERENCE TO RELATED APPLICATION

The present application is based on PCT filing PCT/JP2021/029435, filed Aug. 6, 2021, the entire contents of which are incorporated herein by reference.

TECHNICAL FIELD

The present disclosure relates to a relay control system, a relay apparatus, and a relay control method, and particularly to a relay control system, a relay apparatus, and a relay control method for relaying wireless communication using a reconfigurable intelligent surface.

BACKGROUND ART

NPL 1 and NPL 2 below disclose a technique using a reconfigurable intelligent surface (RIS) as a relay apparatus for wireless communication.

Figure 1:
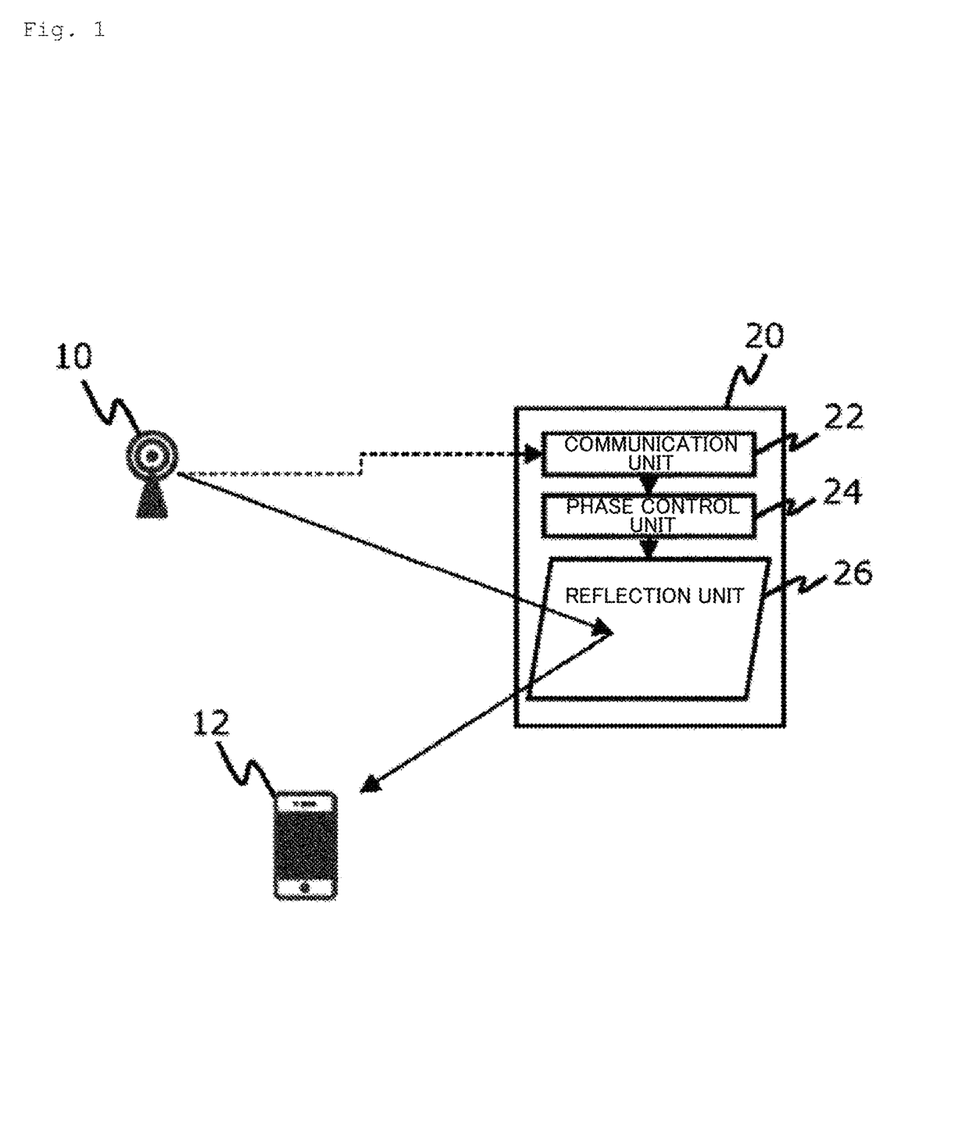
FIG. 1 is the diagram for illustrating a configuration of a conventional relay control system using a relay apparatus.

FIG. 1 illustrates a conventional configuration of a wireless communication relay control system using the RIS. The system illustrated in FIG. 1 includes a transmission point 10, a reception point 12, and a RIS 20. The transmission point 10 is configured of a radio base station or the like under the management of a communication carrier. The reception point 12 is configured of a user terminal such as a smart phone. The RIS 20 is disposed to relay a radio signal between the transmission point 10 and the reception point 12.

Figure 2:
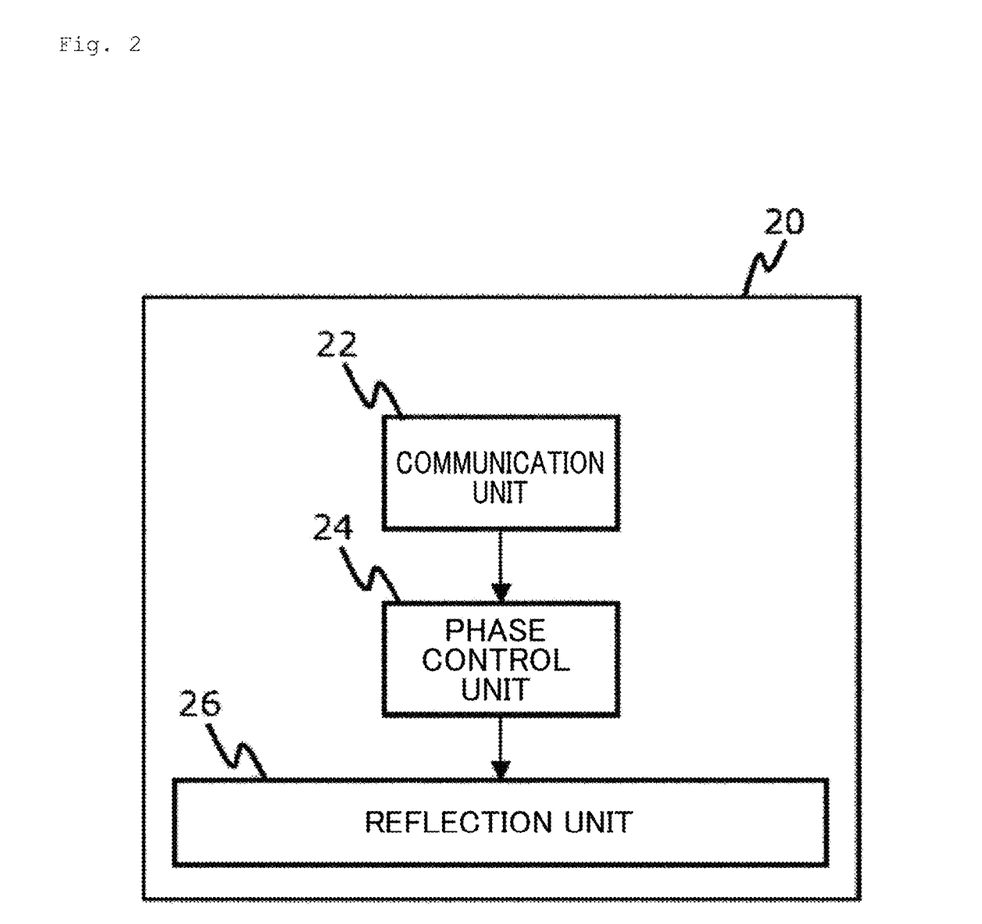
FIG. 2 is a block diagram for illustrating a configuration of a conventional relay apparatus.

FIG. 2 illustrates the configuration of a conventional RIS 20. The RIS 20 includes a communication unit 22. The communication unit 22 receives information necessary for controlling the RIS 20 from the transmission point 10 or the reception point 12. The control information acquired by the communication unit 22 is provided to a phase control unit 24.

The phase control unit 24 performs a process for controlling a phase to be applied to the reflection wave based on the control information. The result of the phase control is provided to a reflection unit 26.

The reflection unit 26 is provided with a large number of reflection elements disposed two-dimensionally. Each of the reflection elements can reflect an incoming wave incident in a high frequency band after controlling a phase. The phase control is performed for each of the reflection elements included in the reflection unit 26. When appropriate phase control is performed in each of the reflection elements, the communication wave reflected by the reflection unit 26 becomes a beam directed in a specific direction.

In a situation where an obstacle exists between the transmission point 10 and the reception point 12, it is sometimes difficult to directly transmit and receive a radio signal between the transmission point 10 and the reception point 20. In such a case, if the RIS 20 generates a beam toward the reception point 12 by phase control, good receiving characteristics can be obtained at the reception point 12. Therefore, the RIS 20 is useful for expanding coverage in a high frequency band.

CITATION LIST

Non Patent Literature

[NPL 1] Wireless Communications Through Reconfigurable Intelligent Surfaces, ERTUGRUL BASAR, MARCO DI RENZO, JULIEN DE ROSNY, MEROUANE DEBBAH, MOHAMED-SLIM ALOUINI, RUI ZHANG, p116753-116773, VOLUME 7, 2019, IEEE Access, Aug. 13, 2019

[NPL 2] Intelligent Reflecting Surface Enhanced Wireless Network via Joint Active and Passive Beamforming, Qingqing Wu, Rui Zhang, IEEE TRANSACTIONS ON WIRELESS COMMUNICATIONS, p5394-5409, VOL. 18, No. 11, November 2019

SUMMARY OF INVENTION

Technical Problem

In the conventional relay control system, the RIS 20 is disposed to connect one transmission point 10 to one reception point 12. On the other hand, in the field of radio communication, an increase in the number of transmission points is expected as the number of distributed antennas and the number of cells is reduced. If the RIS 20 is installed for each transmission point, the network cost increases. In addition, if the number of RISs 20 to be disposed is increased, it is difficult to secure installation places.

The present disclosure has been made in view of the above problems, and a first object thereof is to provide a relay control system that suppresses network costs and facilitates securing of an installation place using a relay apparatus that reflects incoming waves from each of a plurality of transmission points toward each of a plurality of reception points.

In addition, a second object of the present disclosure is to provide a relay apparatus that reflects incoming waves from each of a plurality of transmission points toward each of a plurality of reception points, thereby suppressing network costs and facilitating securement of an installation place.

In addition, a third object of the present disclosure is to provide a relay control method for suppressing network costs and facilitating securing of an installation place using a relay apparatus that reflects incoming waves from each of a plurality of transmission points toward each of a plurality of reception points.

Solution to Problem

In order to achieve the above object, it is preferable that a first aspect is a relay control system using a relay apparatus including a plurality of reflection elements capable of applying independent phase shifts to incoming waves, the system including
  a communication unit that receives transmission point information from one or a plurality of transmission points,
  an element allocation unit that determines allocation of the plurality of reflection elements based on the transmission point information, and
  a phase control unit that applies a phase weight to each of the plurality of reflection elements, in which
  the element allocation unit is configured to execute
  a process of determining the number of communication links to be established via the relay apparatus based on the transmission point information,
  an element number determination process of determining the number of reflection elements allocated to each of the communication links, and
  a process of determining reflection elements to be allocated to each of the communication links according to the determined number, and the phase control unit is configured to execute a process of determining the phase weight so that a beam directed to a reception point being a communication destination of each communication link is generated by a reflection wave generated by each reflection element allocated to each of the communication links.

In addition, it is preferable that a second aspect is a relay apparatus including
a reflection unit including a plurality of reflection elements capable of applying independent phase shifts to an incoming wave,
a communication unit that receives transmission point information from one or a plurality of transmission points,
an element allocation unit that determines allocation of the plurality of reflection elements based on the transmission point information, and
a phase control unit that applies a phase weight to each of the plurality of reflection elements, in which
the element allocation unit is configured to execute
a process of determining the number of communication links to be established based on the transmission point information,
a process of determining the number of reflection elements allocated to each of the communication links, and
a process of determining reflection elements to be allocated to each of the communication links according to the determined number, and
the phase control unit is configured to execute a process of determining the phase weight so that a beam directed to a reception point being a communication destination of each communication link is generated by a reflection wave generated by each reflection element allocated to each of the communication links.

In addition, it is preferable that a third aspect is a relay control method using a relay apparatus including a plurality of reflection elements capable of applying independent phase shifts to incoming waves, the method including
a step of receiving transmission point information from one or a plurality of transmission points,
an element allocation step of determining allocation of the plurality of reflection elements based on the transmission point information, and
a phase control step of applying a phase weight to each of the plurality of reflection elements, in which
the element allocation step includes
a step of determining the number of communication links to be established via the relay apparatus based on the transmission point information,
a step of determining the number of reflection elements to be allocated to each of the communication links, and
a step of determining reflection elements to be allocated to each of the communication links according to the determined number, and
the phase control step includes a step of determining the phase weight so that a beam directed to a reception point being a communication destination of each communication link is generated by a reflection wave generated by each reflection element allocated to each of the communication links.

Advantageous Effects of Invention

According to the first to third aspects, the single relay apparatus can reflect incoming waves from each of the plurality of transmission points toward each of the plurality of reception points. Therefore, according to these aspects, in a situation where a number of transmission points exist, the network cost is suppressed as compared with a case where one relay apparatus is set for each transmission point, and the installation place can be easily secured.

DESCRIPTION OF EMBODIMENTS

First Embodiment

[Configuration of First Embodiment]

Figure 3:
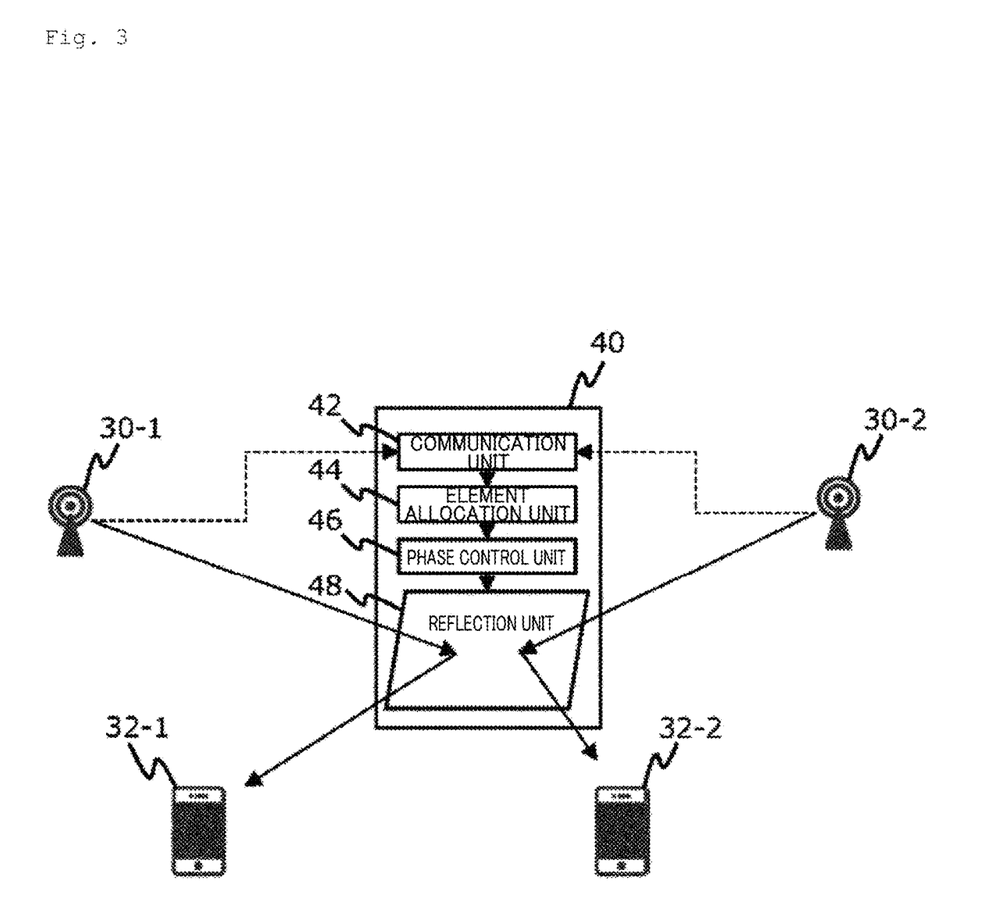
FIG. 3 is a diagram for illustrating a configuration of a relay control system of First Embodiment of the present disclosure.

FIG. 3 illustrates a configuration of a relay control system of First Embodiment of the present disclosure. The system illustrated in FIG. 3 includes a first transmission point 30-1 and a first reception point 32-1, and a second transmission point 30-2 and a second reception point 32-2. Hereinafter, in a case where it is not necessary to distinguish the first transmission point 30-1 from the second transmission point 30-2, the suffixes of the reference numerals are omitted, and they are simply referred to as "transmission point 30." Similarly, in a case where it is not necessary to distinguish the first reception point 32-1 from the second reception point 32-2, they are simply referred to as "reception point 32."

In the present embodiment, the transmission point 30 is configured by a radio base station or the like under the management of a communication carrier. On the other hand, the reception point 32 is configured of a user terminal such as a smartphone. In a case where the reception point 32 belongs to the communication area of the transmission point 30 and there is no obstacle or the like between them, the reception point 32 can directly communicate with the transmission point 30.

The relay control system according to the present embodiment includes a relay apparatus 40. The relay apparatus 40 is configured by a reconfigurable intelligent surface, that is, a RIS. The relay apparatus 40 is disposed to relay a radio signal between the transmission point 30 and the reception point 32. Even in a case where direct communication with the transmission point 30 cannot be performed, the reception point 32 may communicate with the transmission point 30 via the relay apparatus 40.

Figure 4:
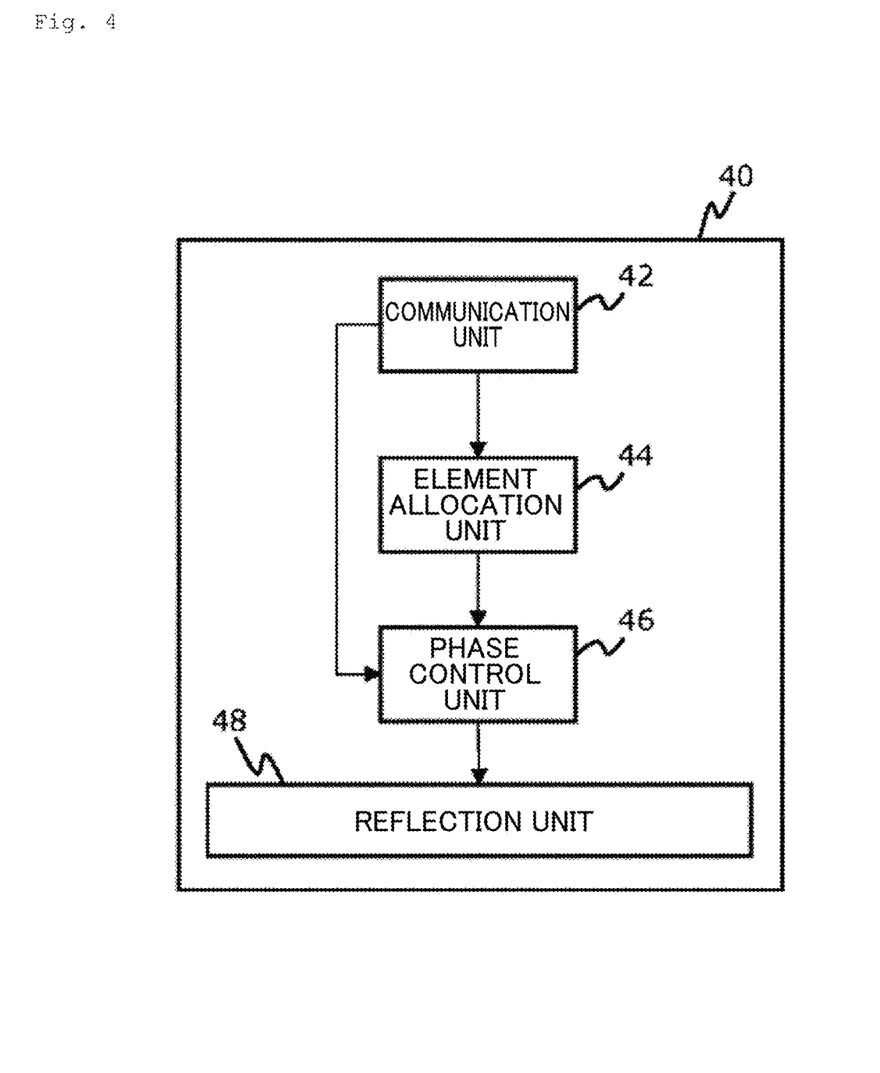
FIG. 4 is a block diagram for illustrating a configuration of a relay apparatus included in the relay control system illustrated in FIG. 3.

FIG. 4 is a block diagram for illustrating a configuration of the relay apparatus 40. As illustrated in FIG. 4, the relay apparatus 40 includes a communication unit 42. The communication unit 42 is a block for transmitting and receiving control information to and from the transmission point 30 or the reception point 32 in order to be used for controlling the relay apparatus 40. The control information acquired by the communication unit 42 is provided to an element allocation unit 44 and a phase control unit 46. In addition, the processing result of the element allocation unit 44 is provided to the phase control unit 46. The processing result of the phase control unit 46 is provided to a reflection unit 48.

Figure 5:
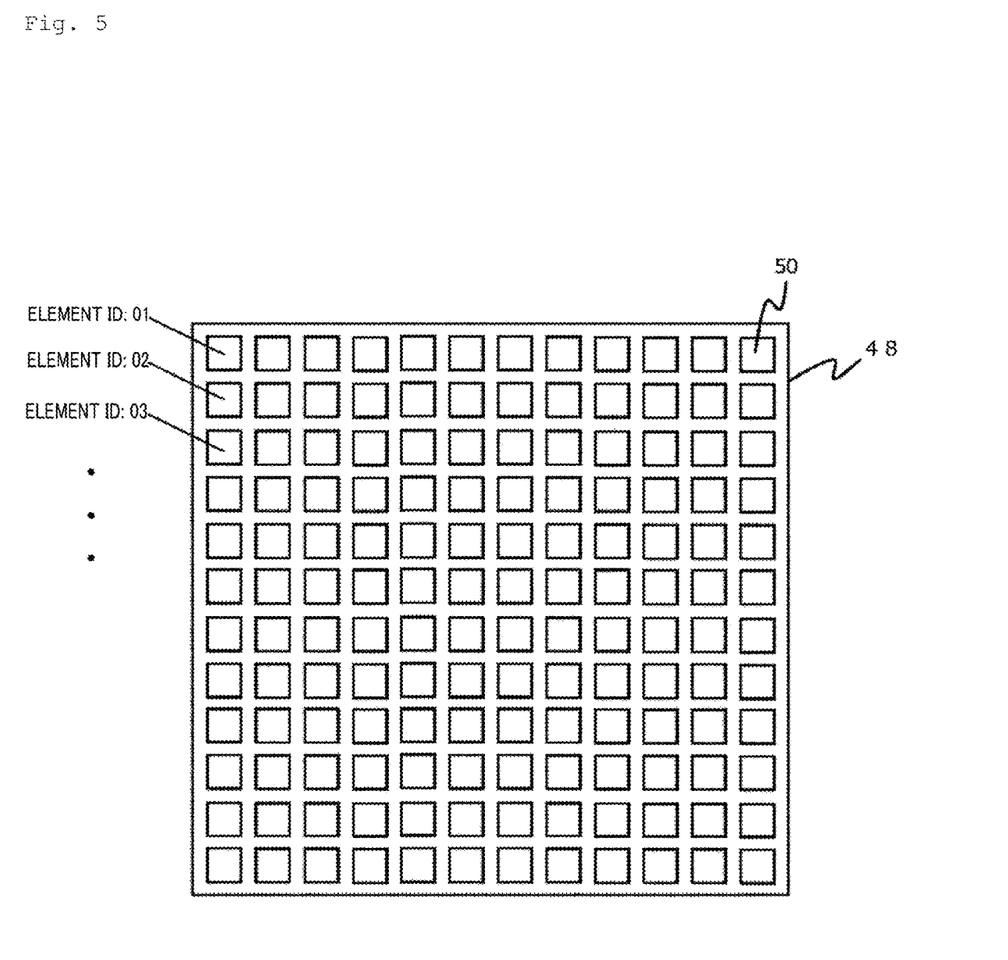
FIG. 5 is a diagram illustrating a configuration of a reflection unit included in the relay apparatus in First Embodiment of the present disclosure.

FIG. 5 is a diagram for illustrating a configuration of the reflection unit 48. As illustrated in FIG. 5, the reflection unit 48 has a plurality of reflection elements 50. The reflection elements 50 are disposed regularly and two-dimensionally at equal intervals. Each of the reflection elements 50 has a mechanism for reflecting or transmitting a radio wave emitted from the transmission point 30. Individual IDs are applied to the reflection elements 50, and they can be controlled independently of each other. More specifically, each of the reflection elements 50 can generate a reflection wave with a desired phase shift by adding a desired phase weight to an incoming wave.

The phase shift can be generated, for example, by connecting a variable phase shifter for applying an arbitrary phase shift to each reflection element 50. Alternatively, the phase shift may be generated using a device capable of controlling the phase in a binary manner by turning on and off the switch. In addition, the phase of the incoming wave reflected by the reflection element 50 may be shifted by another method.

The description will proceed with reference to FIG. 4 again. A control signal for each of the reflection elements 50 is provided to the reflection unit 48 from the phase control unit 46. The control signal includes a phase weight command for each of the reflection elements 50. The phase weight can be calculated, for example, by a method of channel estimation, a method of using position information (for example, see Japanese Patent No. 5200090), or other known methods.

As described above, the phase control unit 46 is provided with the processing result of the element allocation unit 44. The element allocation unit 44 is a block for determining how to allocate the reflection elements 50 of the reflection unit 48 based on the control information received from the communication unit 42. Specifically, the element allocation unit 44 determines the number of communication links to be handled by the relay apparatus 40 based on control information from the communication unit 42. For example, in a case where the communication unit 42 receives the control information from two transmission points 30-1 and 30-2, it is determined that there are two communication links.

The element allocation unit 44 then determines the number of reflection elements 50 to be allocated to each of the communication links. Further, the element allocation unit 44 concretely determines the reflection elements 50 to be allocated to each of the communication links based on the determined number. Then, the element allocation unit 44 provides the determination result to the phase control unit 46.

The phase control unit 46 provides a control signal for achieving a phase shift suitable for each communication link to the reflection element 50 allocated to each communication link. Thus, a plurality of reflection waves for establishing a plurality of communication links is generated by one relay apparatus 40.

[Operation of First Embodiment]

Figure 6:
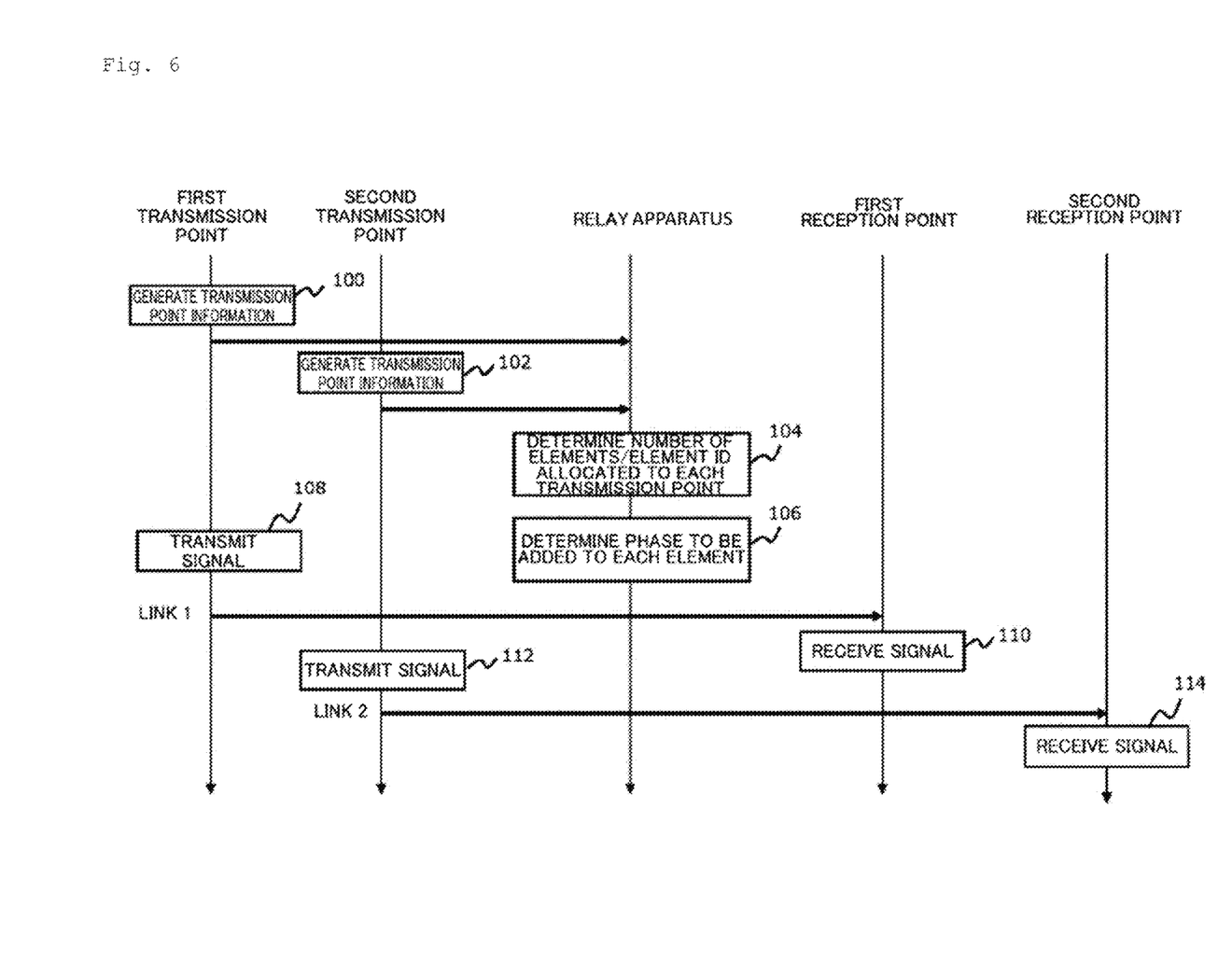
FIG. 6 is a flowchart for illustrating an operation of the relay control system of First Embodiment of the present disclosure.

FIG. 6 is a flowchart for illustrating an operation of the relay control system illustrated in FIG. 3. In the example illustrated in FIG. 6, first, the first transmission point 30-1 generates transmission point information (step 100). Then, the second transmission point 30-2 generates transmission point information (step 102).

The transmission point information includes, for example, a part or all of the following information.
 (1) Transmission point identification number
 (2) Frequency channel
 (3) Required number of reflective elements
 (4) Positional information and installation height of transmitting point
 (5) Traffic volume (cumulative traffic, time average traffic volume, or measured traffic volume in a fixed period)
 (6) The number of connected terminals (the number of reception points to establish communication)

Both transmission point information generated at the first transmission point 30-1 and the second transmission point 30-2 are received by the relay apparatus 40. The relay apparatus 40 first determines that the number of communication links to be established is two based on them. Then, the relay apparatus 40 determines the number of reflection elements 50 to be allocated to each transmission point 30 and the element ID (step 104).

Specifically, the allocation of the reflection elements 50 is calculated based on the "allocation index" set by the following method. The following methods may be selectively used as a single method, or may be used in combination of two or three or more methods.

(1) An allocation index is set according to "the required number of reflection elements" included in the transmission point information. Thus, this makes it possible to respond to requests from each transmission point 30.

(2) An allocation index is set in accordance with the distance between each transmission point 30 and the relay apparatus 40. Specifically, first, the distance between the transmission point 30 and the relay apparatus 40 is calculated based on the "position information" included in the transmission point information. This calculation may be executed by the relay apparatus 40, but may be executed by an external control device (not illustrated) and the result may be provided to the relay apparatus 40. The relay apparatus 40 allocates more reflection elements as the distance is longer. An incoming wave from the transmission point 30 is attenuated as the propagation distance becomes longer. According to the above-mentioned method, the influence of attenuation can be suppressed by allocating a large number of reflection elements to an incoming wave having a large attenuation.

(3) An allocation index is set according to the "traffic amount" included in the transmission point information. The relay apparatus 40 allocates many reflection elements 50 to the transmission point 30 having a large traffic volume. Thus, the reflection wave with high intensity can be generated at the transmission point 30 with a large traffic volume, and an environment in which excellent communication quality can be easily secured can be disposed.

(4) An allocation index is set according to "the number of connected terminals" included in the transmission point information. The relay apparatus 40 allocates many reflection elements 50 to a transmission point where the number of connected terminals is large. Thus, it is possible to suppress the number of reflection elements 50 allocated to individual terminals from becoming unbalanced.

When the setting of the "allocation index" is completed, the relay apparatus 40 calculates the number of the reflection elements 50 to be allocated to each transmission point according to the following equation.

$$\text{(The number of allocation elements)} = \text{(Total number of reflection elements)} \times \text{(Allocation index of the object transmission point)} / \text{(Total amount of allocation indexes)} \quad (1)$$

Note that, the "total amount of allocation indexes" is a total value of "allocation indexes" for all transmission points 30.

It is to be noted that Equation (1) above may be replaced by Equation (2) below by weighting each transmission point. The weight can be set between "0" and "1," and the total sum of the weights of the respective transmission points is set to "1".

$$\text{(The number of allocation elements)} = \text{(Total number of reflection elements)} \times \text{(Weight of the object transmission point)} \times \text{(Allocation index of the object transmission point)} / \text{(Total amount of the allocation index)} \quad (2)$$

According to the method using Equation (2) above, by applying a large weight to the specific transmission point 30, it is possible to prepare an environment in which communication related to the transmission point 30 is given priority to communication related to another transmission point 30.

Figure 7:
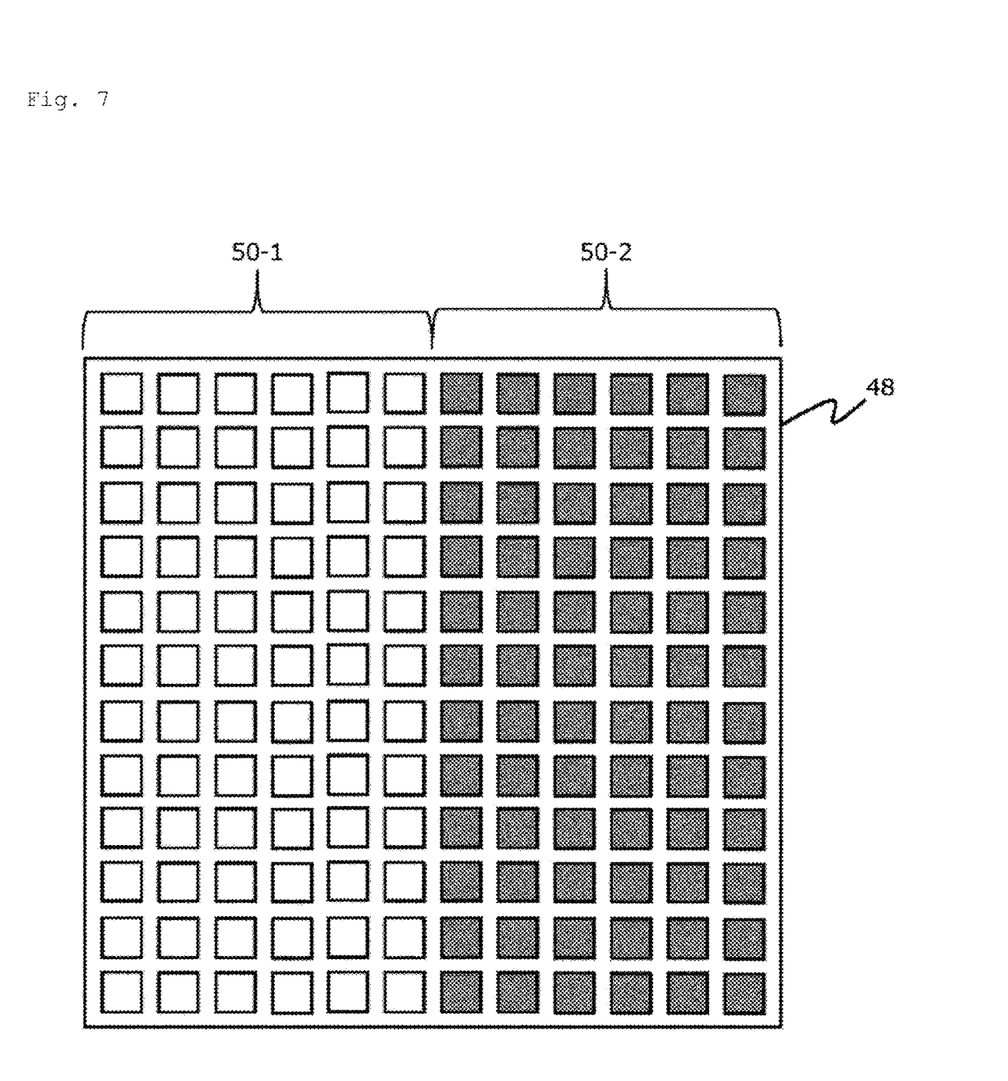
FIG. 7 is a diagram for illustrating a characteristic operation of the relay apparatus according to First Embodiment of the present disclosure.

FIG. 7 illustrates an example of the allocation of the reflection elements 50 to two transmission points 30 in which the assignment conditions, that is, the "allocation index" and the "weight" are the same. In this case, among a plurality of reflection elements 50 provided in the reflection unit 48, an element group 50-1 of a left half is allocated to the first transmission point 30-1, and an element group 50-2 of a right half is allocated to the second transmission point 30-2. However, the allocation method is not limited to such a simple division, and as long as the allocation number is satisfied, a specific combination of elements to be assigned can be freely set including a random combination. In addition, the number of transmission points 30 is not limited to two, and the number of transmission points 30 may be three or more, and the reflection elements 50 may be allocated to three or more transmission points 30. By the above processing, the ID of the reflection element 50 allocated to each transmission point 30 is linked to the transmission point 30 of the assignment destination.

In the flowchart illustrated in FIG. 6, next, the phase to be added to each of the reflection elements 50 is determined (step 106). This processing is performed so that a beam directed to the reception point 32 which is a communication destination of each transmission point 30 is generated by a reflection wave generated by each reflection element 50 connected to each transmission point 30.

However, in a case where one transmission point 30 communicates with two or more reception points 32, a plurality of communication links are established for the transmission point 30. Then, the reflection element 50 is allocated to each of the plurality of communication links. In this case, the processing of step 106 is performed so that a beam directed to the reception point 32 which is the communication destination of each communication link is generated by the reflection wave generated by each of the reflection elements allocated to each communication link.

In the example illustrated in FIG. 6, a radio signal is transmitted from the first transmission point 30-1 following the processing of step 106 (step 108). The signal is reflected by the reflection element 50 allocated to the first transmission point 30-1 in the relay apparatus 40. As a result, this signal becomes a beam directed to the first reception point 32-1, and is received by the first reception point 32-1 via the first communication link (step 110).

In the example illustrated in FIG. 6, furthermore, the radio signal is transmitted from the second transmission point 30-2 (step 112). The signal is reflected by the reflection element 50 allocated to the second transmission point 30-2 in the relay apparatus 40. As a result, the signal becomes a beam directed to a second reception point 32-2, and is received by the second reception point 32-2 via a second communication link (step 114).

As described above, according to the relay control system of the present embodiment, a plurality of communication links connecting each of the plurality of transmission points 30 and each of the plurality of reception points 32 can be established by using one relay apparatus 40. Thus, in this system, the network cost can be suppressed and the installation place of the relay apparatus 40 can be easily secured as compared with a conventional configuration in which one relay apparatus 40 is installed for each transmission point 30.

Second Embodiment

Next, Second Embodiment of the present disclosure will be described with reference to FIGS. 8 to 10.

Figure 8:
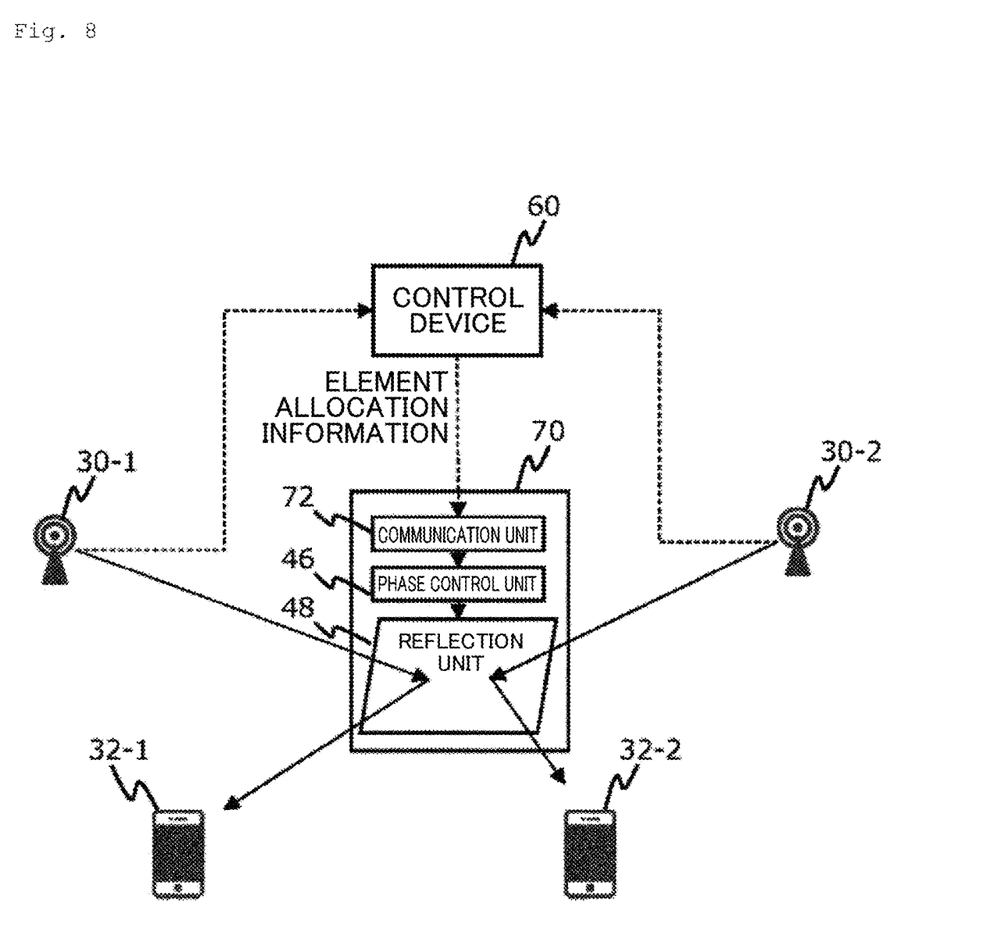
FIG. 8 is a diagram illustrating a configuration of a relay control system of Second Embodiment of the present disclosure.

FIG. 8 is the diagram for illustrating a configuration of a relay control system of Second Embodiment of the present disclosure. Note that, in FIG. 8, the same elements as those illustrated in FIG. 3 are designated by a common reference numeral, and the description thereof will be omitted or simplified.

The relay control system of the present embodiment is similar to the relay control system of First Embodiment except that the functions of the relay apparatus 40 are distributed to a control device 60 and a relay apparatus 70. More specifically, in the present embodiment, the function of element allocation provided in the relay apparatus 40 in First Embodiment is provided not to the relay apparatus 70 but to the control device 60.

[Feature of Embodiment]

Figure 9:
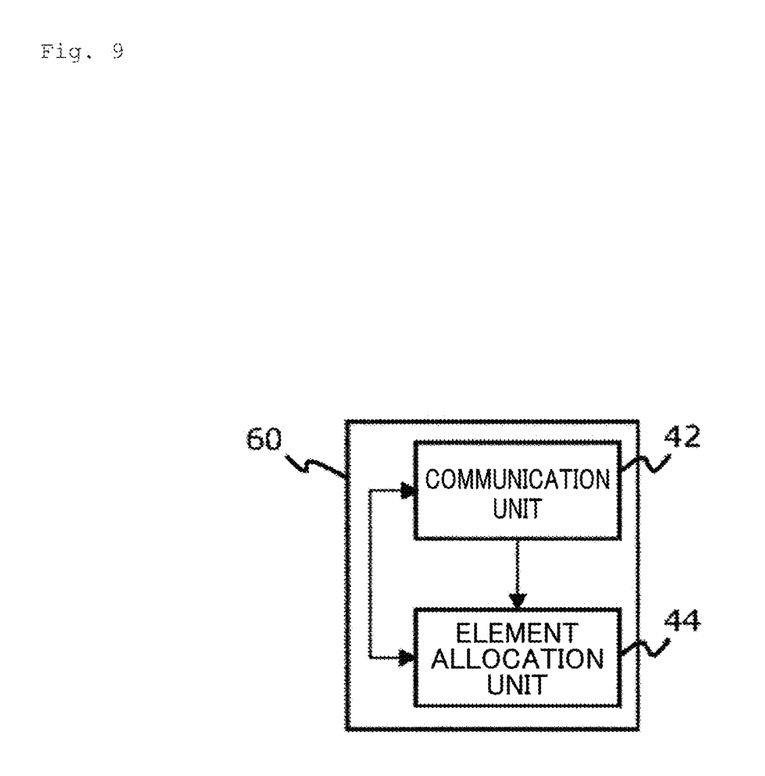
FIG. 9 is a block diagram for illustrating a configuration of a control device included in the relay control system illustrated in FIG. 8.

FIG. 9 is a block diagram for functionally illustrating the configuration of the control device 60 illustrated in FIG. 8. As illustrated in FIG. 9, the control device 60 in the present embodiment includes the communication unit 42 and the element allocation unit 44. These functions are similar to those of the communication unit 42 and the element allocation unit 44 provided in the relay apparatus 40 in First Embodiment. That is, in the present embodiment, a control unit 60 installed separately from the relay apparatus 70 receives transmission point information from each of the transmission points 30, the number and ID of the reflection elements 50 to be allocated to each transmission point 30 are determined based on the transmission point information.

Figure 10:
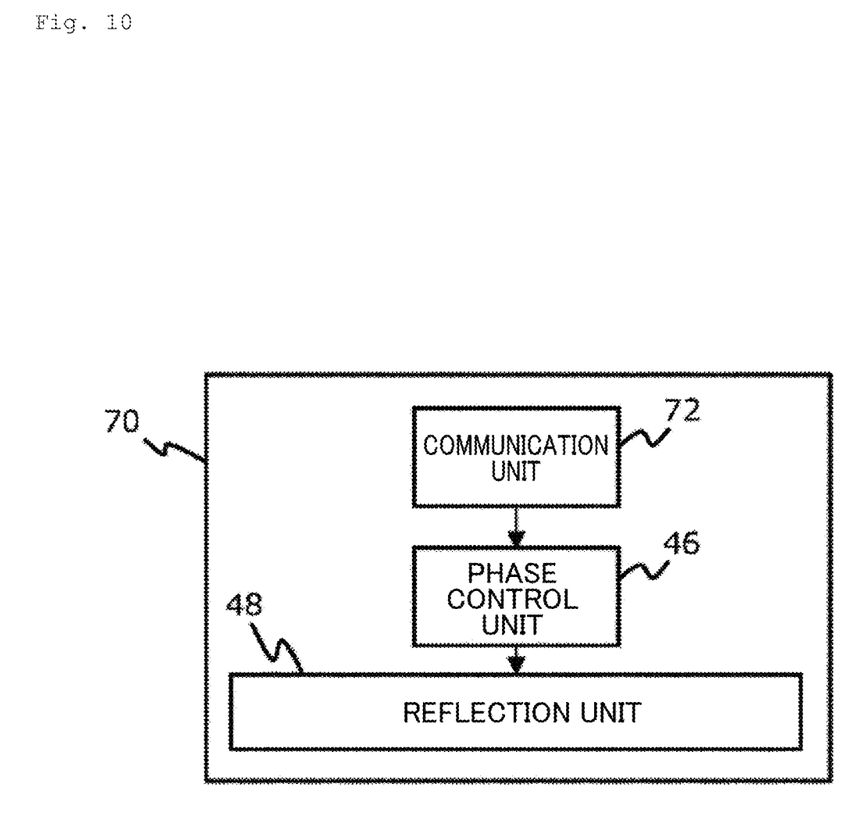
FIG. 10 is a block diagram for a configuration of a relay apparatus included in the relay control system illustrated in FIG. 8.

FIG. 10 is a block diagram for functionally illustrating the configuration of the relay apparatus 70 illustrated in FIG. 8. As illustrated in FIG. 10, the relay apparatus 70 according to the present embodiment includes a communication unit 72. The communication unit 72 is a block for receiving the result of element allocation, that is, the ID information of the reflection element 50 allocated to each transmission point 30, from the control device 60. The phase control unit 46 of the relay apparatus 70 provides the phase weight information to each of the reflection elements 50 in accordance with the ID information thus received, as in First Embodiment.

As a result, the relay control system of the present embodiment can establish a plurality of communication links connecting each of the plurality of transmission points 30 and each of the plurality of reception points 32 by using one relay apparatus 70, as in the case of First Embodiment. Therefore, the system of the present embodiment can also suppress the network cost and easily secure the installation place of the relay apparatus 40, as in the case of First Embodiment, and sufficient coverage can be obtained.

REFERENCE SIGNS LIST 30, 30-1, 30-2 Transmission unit
32, 32-1, 32-2 Reception unit
40, 70 Relay apparatus
42 Communication unit
44 Element allocation unit
46 Phase control unit
48 Reflection unit
50 Reflection element
50-1 left half of element group
50-2 Right half of element group
60 Control device

The invention claimed is:

1. A relay controller using a relay including a plurality of reflectors capable of applying independent phase shift to incoming waves, the relay controller comprising:
communication circuitry that receives transmission point information from one or more transmission points;
reflector allocation circuitry that determines allocation of the plurality of reflectors based on the transmission point information; and
phase control circuitry that applies a phase weight to each of the plurality of reflectors, wherein
the reflector allocation circuitry is configured to execute;
determining the number of communication links to be established via the relay based on the transmission point information;
determining the number of reflectors allocated to each of the communication links, and
determining reflectors to be allocated to each of the communication links according to the determined number, wherein
the phase control circuitry is configured to execute determining the phase weight so that a beam directed to a reception point being a communication destination of each communication link is generated by a reflection wave generated by each reflector allocated to each of the communication links.

2. A relay comprising:
a reflector including a plurality of reflectors capable of applying independent phase shifts to an incoming wave;
communication circuitry that receives transmission point information from one or more transmission points;
reflector allocation circuitry that determines allocation of the plurality of reflectors based on the transmission point information; and
phase control circuitry that applies a phase weight to each of the plurality of reflectors, wherein
the reflector allocation circuitry is configured to execute;
determining the number of communication links to be established based on the transmission point information;
determining the number of reflectors allocated to each of the communication links, and
determining reflectors to be allocated to each of the communication links according to the determined number, wherein
the phase control circuitry is configured to execute determining the phase weight so that a beam directed to a reception point being a communication destination of each communication link is generated by a reflection wave generated by each reflector allocated to each of the communication links.

3. A relay control method using a relay including a plurality of reflectors capable of applying independent phase shifts to incoming waves, the method comprising:
receiving transmission point information from one or a plurality of transmission points;
determining allocation of the plurality of reflectors based on the transmission point information; and
applying a phase weight to each of the plurality of reflectors, wherein
the determining allocation of the plurality of reflectors includes
determining the number of communication links to be established via the relay based on the transmission point information,
determining the number of reflectors to be allocated to each of the communication links, and
determining reflectors to be allocated to each of the communication links according to the determined number, and
the applying a phase weight includes a step of determining the phase weight so that a beam directed to a reception point being a communication destination of each communication link is generated by a reflection wave generated by each reflector allocated to each of the communication links.

4. The relay controller according to claim 1, wherein
the transmission point information includes a required number of reflectors required by the transmission point, and
the number of reflectors to be allocated to the communication link is determined based on the required number of reflectors.

5. The relay controller according to claim 1, wherein
the transmission point information includes a distance between the transmission point and the relay, and
the number of reflectors to be allocated to the communication link is determined based on the distance.

6. The relay controller according to claim 1, wherein
the transmission point information includes a traffic amount of communication at the transmission point, and the number of reflectors to be allocated to the communication link is determined based on the traffic amount.

7. The relay controller according claim 1, wherein
the transmission point information includes the number of terminals connected to the transmission point, and
the number of reflectors to be allocated to the communication link is determined based on the number of terminals.

8. The relay controller according to claim 1, wherein
the reflector allocation circuitry further executes acquiring a weight determined for each transmission point in a case where a plurality of transmission points to establish the communication link are recognized, and
the weight is reflected on the number of reflectors to be allocated to the communication link.

9. The relay controller according to claim 4, wherein
the transmission point information includes a distance between the transmission point and the relay, and
the number of reflectors to be allocated to the communication link is determined based on the distance.

10. The relay controller according to claim 4, wherein
the transmission point information includes a traffic amount of communication at the transmission point, and
the number of reflectors to be allocated to the communication link is determined based on the traffic amount.

11. The relay controller according to claim 5, wherein
the transmission point information includes a traffic amount of communication at the transmission point, and
the number of reflectors to be allocated to the communication link is determined based on the traffic amount.

12. The relay controller according to claim 4, wherein
the transmission point information includes the number of terminals connected to the transmission point, and
the number of reflectors to be allocated to the communication link is determined based on the number of terminals.

13. The relay controller according to claim 5, wherein
the transmission point information includes the number of terminals connected to the transmission point, and
the number of reflectors to be allocated to the communication link is determined based on the number of terminals.

14. The relay controller according to claim 6, wherein
the transmission point information includes the number of terminals connected to the transmission point, and
the number of reflectors to be allocated to the communication link is determined based on the number of terminals.

15. The relay controller according to claim 4, wherein
the reflector allocation circuitry further executes acquiring a weight determined for each transmission point in a case where a plurality of transmission points to establish the communication link are recognized, and
the weight is reflected on the number of reflectors to be allocated to the communication link.

16. The relay controller according to claim 5, wherein
the reflector allocation circuitry further executes acquiring a weight determined for each transmission point in a case where a plurality of transmission points to establish the communication link are recognized, and
the weight is reflected on the number of reflectors to be allocated to the communication link.

17. The relay controller according to claim 6, wherein
the reflector allocation circuitry further executes acquiring a weight determined for each transmission point in a case where a plurality of transmission points to establish the communication link are recognized, and
the weight is reflected on the number of reflectors to be allocated to the communication link.

18. The relay controller according to claim 7, wherein
the reflector allocation circuitry further executes acquiring a weight determined for each transmission point in a case where a plurality of transmission points to establish the communication link are recognized, and
the weight is reflected on the number of reflectors to be allocated to the communication link.

* * * * *